United States Patent [19]
Boes

[11] 3,747,618
[45] July 24, 1973

[54] AUTOMATIC SHUT-OFF VALVE SYSTEM
[76] Inventor: Roger T. Boes, 3713 Bixler St., Metairie, La. 70001
[22] Filed: Aug. 13, 1971
[21] Appl. No.: 171,475

[52] U.S. Cl. .................. 137/80, 137/81, 137/486, 169/19, 251/58, 251/62
[51] Int. Cl. ............................................. F16k 17/38
[58] Field of Search .............. 251/58, 309; 137/80, 137/81, 457, 460; 169/4, 19, 42

[56] References Cited
UNITED STATES PATENTS
| | | | |
|---|---|---|---|
| 2,082,940 | 6/1937 | Brisbane et al. | 251/58 X |
| 2,032,623 | 3/1936 | Lewis | 251/309 |
| 1,815,889 | 7/1931 | Bissonette | 137/80 |
| 3,021,903 | 2/1962 | Ault | 169/4 X |

Primary Examiner—Robert G. Nilson
Assistant Examiner—Edward Look
Attorney—Pugh & Laiche

[57] ABSTRACT

An automatic shut-off valve system for oil wells and the like including an in-line positive shut-off valve located aft of a well head in line with the main pipeline to a hydrocarbon reservoir within the earth, equipped with various sensing devices such that any dangerous environment existing in the general area of the well head will effectuate a complete and positive shut-off of the hydrocarbon flow; the shut-off valve is of the ball-type and is pneumatically actuated by means of a spring-biased cylinder, piston and rod assembly disposed at a right angle to and off-set from the axis of rotation of the rotating ball member and connected thereto by means of a bell crank assembly; when the line is to be closed a pneumatic pressure is introduced into the cylinder, propelling the piston and rod toward the ball element and by means of the bell crank assembly rotating it ninety degrees; the system includes an auxillary pneumatic system for reopening or unjamming the valve; the edge or lip of the ball serves as a cutting edge to sever any cables or wires in the pipeline.

6 Claims, 6 Drawing Figures

Patented July 24, 1973

INVENTOR.
ROGER T. BOES
BY
ATTORNEYS

INVENTOR.
ROGER T. BOES
BY
ATTORNEYS

Patented July 24, 1973

INVENTOR.
ROGER T. BOES
BY
ATTORNEYS

AUTOMATIC SHUT-OFF VALVE SYSTEM

BACKGROUND AND GENERAL DISCUSSION OF THE INVENTION

The present invention relates to an automatic, emergency shut-off system for high pressure oil pipelines and the like which includes an in-line ball valve having a particularly advantageous and efficacious structure and assembly.

The ever increasing demands for hydrocarbons in the current day industrialized society is largely responsible for the frantic search for oil within the earth. It is here at usually great depths that new pockets of the precious mixture of hydrocarbons can be found although very difficult to reach. The profits are great, for these oils are rich in the low, molecular weight hydrocarbons which are in such great demand in our modern age of plastics, resins and so many other polymers.

The physical problems encountered reaching these deep encasements of hydrocarbons are fantastically enormous, presenting a challenge to any material, tool or organization herewith developed by man. There are many of these physical problems yet unresolved, not the least of which is the uncontrollable flow of the entrapped hydrocarbons through the man-made porthole to the surface of the earth. The cause of this uncontrollable flow is usually the great differential pressure between the pocket in which the fluid is trapped and the average 14.7 pounds per square inch, absolute pressure at the surface of the earth. The high pressure within the pocket result in part from the increased vapor pressure of the hydrocarbons, which in turn is caused by the elevated temperatures which naturally exist at these depths within the earth.

When man bores a hole from the surface of the earth to the entrapped hydrocarbons, the gases and liquids which go to make up the hydrocarbon mixture will flow up the pipeline to the lower pressure point without any assistance. As soon as the hydrocarbons are subjected to the lower pressure, the light molecular weight liquefied hydrocarbons will change state and become gaseous hydrocarbons. This increases the volume of the fluid tremendously at the nozzle of the wellhead at the surface of the earth. The flows are usually at maximum velocity which is sonic velocity. The problem arises when man tries to control this enormous volume of fluid traveling at sonic velocities. The industry has heretofore developed flow control valves, usually pneumatically operated, which are located aft of the well head. This type of valve has time-proven itself very functional in producing flow control on these artesian flows but the basic construction of the prior art devices which have attained good flow control have not provided a truly effective, and positive shut-off mechanism.

Moreover, one of the most controversial subjects related to oil field production and industry in the country today is the control of pollution. At the present time there are various safety devices in use to control the flow of gas and oil production, such as chokes and valves located in an assembly which is known in the oil field as a "Christmas Tree". The "Christmas Tree" is installed at the top of a well with a valve located near the bottom of a production string known as a "Storm Choke". Today the Federal Government is requiring "Storm Choke" installations throughout the entire oil field industry. However, the effectiveness and workability of the prior art "Storm Chokes" has not been satisfactory because of inter alia erosion of its various ports due to the passage of contaminants such as sand and their lack of dependability.

All of the prior art valves have failed to provide the necessary protection of life, limb and our environment, currently desired by the Federal Government. The loss of property, life and limb and damage to our environment over the past few years as a result of the non-controllable flow of artesian hydrocarbon wells has led to the development of the present invention, which includes an in-line, positive, quick-closing shut-off valve located prior to all other valving and activated by numerous sensing points so that any indication of a possible uncontrollable artesian effect will automatically activate said valve and completely and quickly shuts off all flow from the well.

The sensing points are divided into two catagories — pressure and temperature. The pressure sensing apparatus will be activated by the differential pressure across an orifice plate located upstream from the automatic, positive shut-off valve but still prior to all other valving. The orifice plate is in itself a restriction to the flow which creates a differential pressure between the upstream and downstream side of the plate. This differential pressure is measured and a safe value established so that a differential pressure above this tolerance will activate the pressure sensing device, which in turn will automatically close the positive shut-off valve. Another pressure sensing device is located in and around the well head area so that a high pressure as would result from an explosion will be sensed by this device and a positive shut-off of the hydrocarbon flow will be effectuated.

A temperature sensing device is also supplied to automatically shut down all flow of hydrocarbons should a temperature within the immediate area of the well head increase to a point of possible ignition of the hydrocarbons. Usually these temperatures are set high enough so they are only activated by a direct fire.

The valve itself is particularly engineered to be a straight through in-line ball valve to avoid the erosion and corrosive effects that usually exist in an oil well operating at high flow rates. The ball, its casing and the operating mechanisms are made of high strength stainless steel material so that they can stand the shock and stress of a fast shut-off of the sonic velocity flow present in oil wells. Also, this material is strong enough to sheer off any wire lines to downhole devices that may be servicing the well at the time the sensing devices indicate an emergency situation. The sensing devices utilized in the present invention may of course use pressure or electrical signals. The pressure and temperature sensing devices are the primary activators of the automatic system of the present invention. The sensors activate a secondary pneumatic system which actuates the ball valve of the present invention.

DESCRIPTION OF PREFERRED EMBODIMENT

Figure 1:
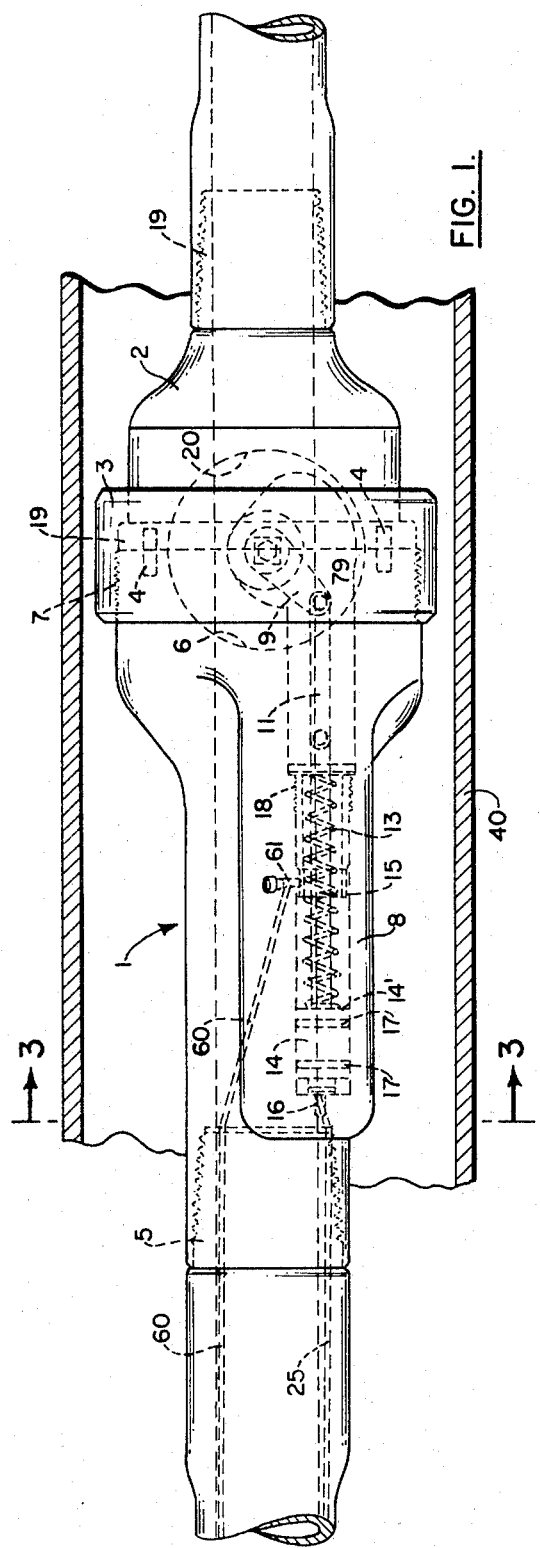
FIG. 1 is a partially cross-sectioned, cut-away side view (in line with the axis of rotation of the ball valve) of the in-line, automatic, positive, shut-off ball valve of the present invention.

The present invention includes an in-line automatic, positive, shut-off ball valve located in the production string of an oil well, automatically activated by abnormal conditions which could result in uncontrollable flow from the well. The present invention will be particularly disclosed with respect to an off-shore well. However, it should be understood, of course, that the invention can be used in any operation that needs a guard against uncontrolled flow.

As illustrated in the drawings, there are four basic parts to the valve, viz. the valve casing, the ball, the crank and the piston.

Figure 2:
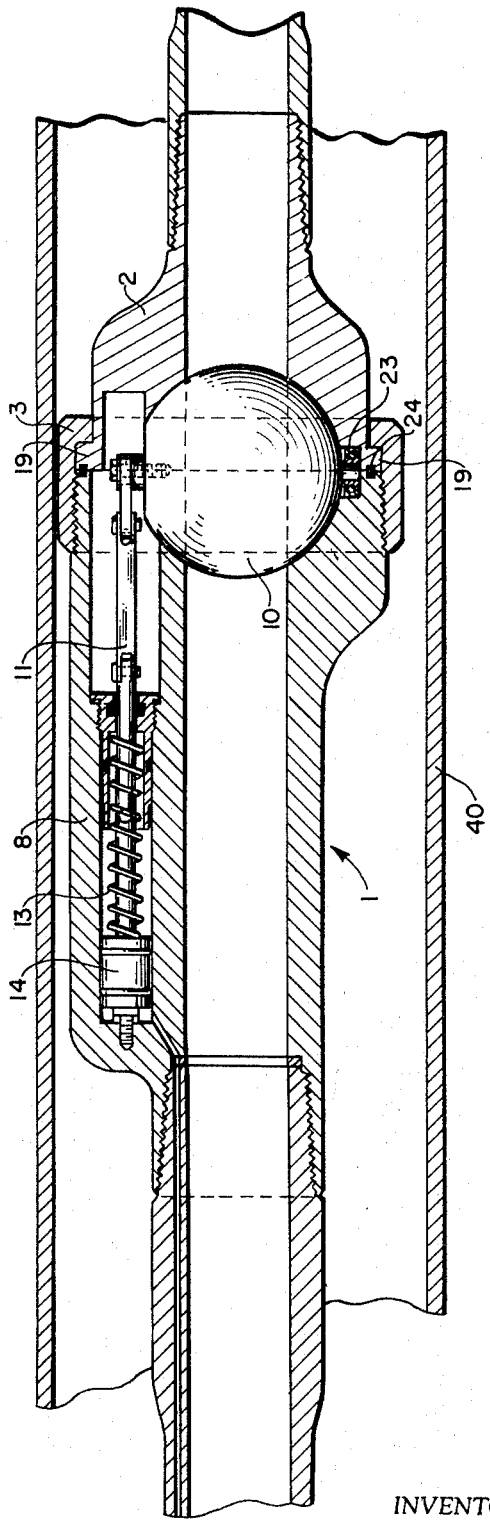
FIG. 2 is a partially cross-sectioned, cut-away top view (perpendicular to the axis of rotation of the ball valve) of the in-line, automatic, positive, shut-off ball valve of the present invention.
Figure 3:
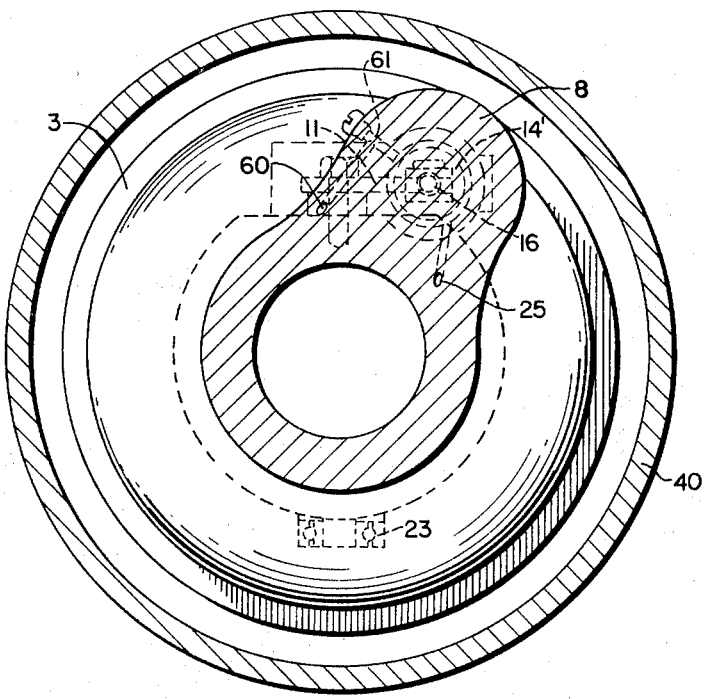
FIG. 3 is a cross-sectional end view of the in-line, automatic, positive, shut-off ball valve of the present invention.

The casing 1, 2 and 3 (note FIGS. 1 and 2) is manufactured from high strength stainless steel cast in a streamline design so as to fit easily into the inner conduit 40 of the oil well casing. The valve casing is made up of three basic, structural parts: the outlet end of the valve, the inlet end of the valve, and the coupling which mates the sections 1 and 2 together. As will be apparent, the casing 1-3 is locked together and encloses and mates with the inner ball member 10, and yet can be relatively quickly and easily detached, giving quick and easy access to the inner working mechanism of the valve.

Alignment pins 4 are positioned in the machined facing of inlet end 2 so as to fit in slots provided in the machined face of outlet end 1. The alignment pins 4 are provided to transmit the rotating action or torque through the joint between outlet end 1 and inlet end 2 to the lower portion of the production line. This torque is encountered when the line is being made up or taken apart.

Figures 4, 5:
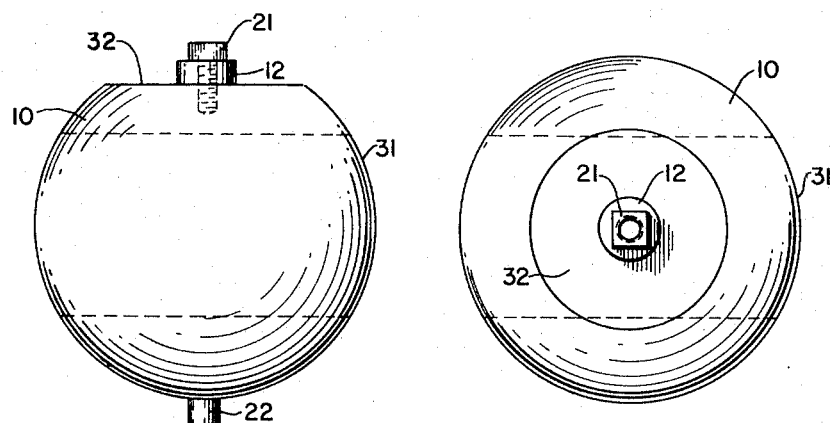
FIGS. 4 and 5 are top and side views, respectively, of the inner ball member of the in-line, automatic, positive, shut-off ball valve of the present invention.

The outlet end piece 1 has at its end a female thread 5, tapered as to the standard in the oil well industry to insure a strong coupling. The opposite end 6 of the outlet end piece 1 is machined to house the inner ball element 10. The outer periphery of the end piece 1 is equipped with a male threaded area 7 that mates with the female threaded area 7 of the outer union-styled coupling 3. The casting of the outlet end piece 1 also includes a hollow cylindrical portion or cylinder 8 which houses a pneumatic activated piston 14 linked by rod 11 to the bell crank 9 which is attached to ball 10 by the crank boss 12 (note FIGS. 4 and 5). The interior of the cylinder 8 contains a spring 13 positioned against the piston bottom 14' so that the piston 14 is held at the top of the cylinder 8, thereby holding the ball 10, in open position. The piston rod 15 is connected from the piston 14 to the connecting rod 11 through bushing 18. The piston rod 15 is positioned through the center of the spring 13. A set screw 16 is provided at the top of cylinder 8 to effectuate the adjustment of top dead center of piston 14, thereby setting the opening position of the ball 10. The piston 14 is equipped with appropriate "O" rings 17 which provide a seal between the processed fluid and the pneumatic fluid used to operate piston 14.

The inlet end piece 2 is supplied with a male threaded end similar to the type used in the oil industry to secure a tight joint when subjected to torque, as described above with respect to casing 1, in the assembling or disassembling operation. The opposite side of the inlet end piece 2 is equipped with a backing collar 3. On the outer periphery of the inlet end piece 2 is a projecting lip 19, which collar 3 holds against when it is tightened down by means of threaded joint at the general area 7 of FIG. 1.

The next part of this valve is the ball 10 (note FIGS. 4 and 5) which is machined to smoothly and snugly fit within the spherical, machined surfaces 6, 20 of the outlet end piece 1 and the inlet end piece 2, respectively. The inner ball 10 has a hole or channel drilled through its center, the diameter of which equals the diameter of the inside of the production line so as to directly mate therewith. One end of the inner ball 10 is machined off to give a flat surface or plateau 32 from which the crank boss 12 protrudes to give a squared off surface upon which the bell crank 9 can be attached with bolt 21 in order to move the ball within the cavity created by coupling the outlet end piece 1 to the inlet end piece 2. The opposite side of ball 10 is supplied with a bearing boss 22 which fits a ball bearing member 23 positioned in the outlet end piece 1 and the inlet end piece 2 joined by the collar 3.

The cylinder 8, piston 14 and rod 15 are thus disposed at a right angle to and offset from the axis of rotation of the inner ball member 10. This alignment and arrangement is particularly advantageous to give a more positive drive with practically instant closure of the valve.

With the piston 14 at the top dead center of the cylinder 8, the ball valve 10 is in the opened position, that is, the hole drilled through the center of the ball is in line with the center of the production string. When the piston 14 is at the bottom of the hollow cylinder 8, the ball valve 10 is closed, that is, the hole drilled through the cylinder of the ball 10 is perpendicular to the center of the production piping, closing off the production line flow. Any adjustments to the closed position can be accomplished by removing or adding shims under the connecting rod bushing 18.

The operation of piston 14, as stated above, is by pneumatic pressure. The pneumatic fluid is supplied to the cylinder 8 through a relatively small line 25. The line can be conducted to the cylinder 8 through the interior of the production piping, and can exit the production line in the general area of the surface of the well head. To close the valve, the pressure in the line acting against the head of the piston 14 is increased sufficiently to overcome the force of the spring 13, thereby swinging the ball 10 a ninety degrees.

Figure 6:
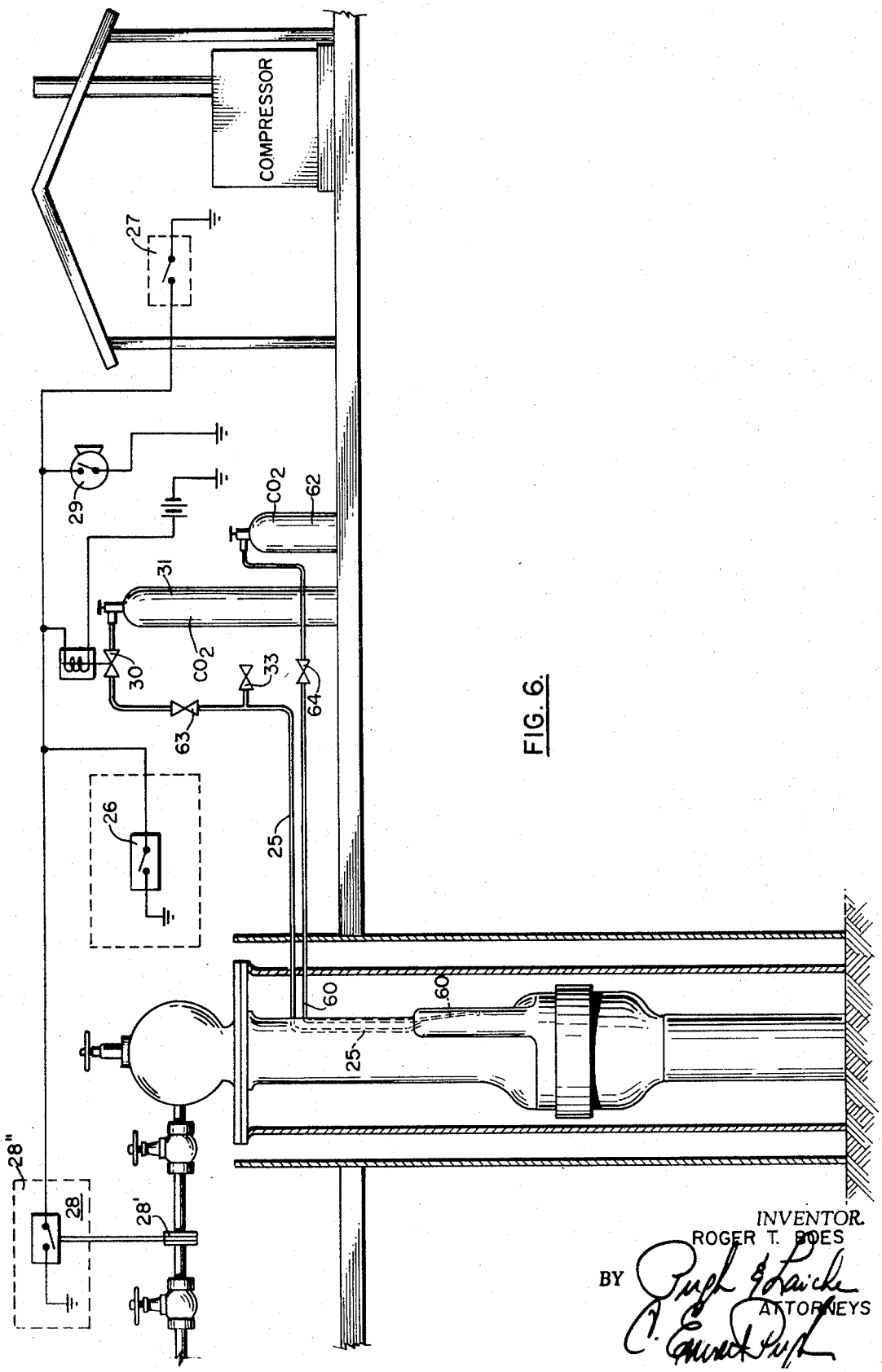
FIG. 6 is a schematic illustration of the overall automatic shut-off valve system of the present invention.

The in-line automatic, positive shut-off valve is actuated by two kinds of sensing devices—pressure and temperature. The temperature sensing devices 26 and 27 (FIG. 6) will detect high temperatures as would be experienced in a fire. The pressure sensor 29 detects high pressures as would be experienced in an explosion, while the pressure sensor 28 is used to detect a differential pressure across a line restriction which would indicate the approach of an uncontrollable flow from the well. The thermal sensors 26 and 27 (FIG. 6) are actually electrical switches and can be set, for example, at approximately 750° or 500° Fahrenheit, as desired. They are positioned in and about the well head area at likely fire ignition points. Pressure sensor 28 will sense a differential pressure across a line restriction or orifice 28' which is located in the main flow line of the well, while high pressure sensor 29 is located in the general area of the well head and would be activated upon an increase in the surrounding pressure as would result from an explosion.

The sensors 26 through 29 can all be of the electrical switch type, designed so that at the desired pressure or temperature, the switch circuitry would be closed. The interconnecting electrical circuitry is connected to switches 26 through 29 in parallel, so that any one of the sensors that may be activated will thereby complete the circuit of the electrical system. Completion of the electrical circuitry by any one of the sensing switches 26 through 29 will activate the solenoid valve 30.

Solenoid valve 30 is located in the pneumatic fluid line to the cylinder 8 on the in-line, automatic, positive, shut-off valve. Pneumatic fluid is supplied by a high pressure gas reservoir through stainless steel tubing. Upon activating solenoid valve 30, the high pressure fluid from the reservoir 31 will flow through the line 25 into the cylinder 8, thereby pushing piston 14 to the bottom of the cylinder and closing ball valve 10.

In order to re-open the in-line automatic, positive, shut-off valve, the high pressure reservoir is isolated from the system by closing valve 30 and then, to relieve the pressure within cylinder 8, bleed valve 33 is opened and the pressure bled off. This will relieve the high pressure within the chamber 8 and the mechanical spring 13 will push the piston 14 back to top dead center, thereby effectuating the opening of the in-line, automatic, positive, shut-off valve. The bleed valve is installed to release the pressure between the check valve 63 and the cylinder 8 so that the valve will open. Should there be a hesitency of the valve opening and putting the well back into operation, a supplemental vent system can be installed in the crank chamber of the valve and connected to a diaphram that serves two purposes: (1) relieving pressure in the crank chamber and cylinder 8, minimizing the expansion of air in this section; and (2) serving as a pressurized accumulator to assist the spring 13 in the cylinder to open the valve by the use of air or hydraulic pressure applied to the nonpressurized side of the diaphram. The diaphram and bleed valve may be located in a convenient area beneath the production platform out of danger of an existing fire.

The high pressure gas reservoir can be readily supplied through the use of $CO_2$ or nitrogen cylinders which are generally commercially available in the oil industry. Another advantage of using the inert gas is that when the in-line, automatic, positive, shut-off valve is bled off in the reopening process through valve 33, the exiting gas can be bled off to the atmosphere without the hazard of pollution.

As a safety measure should a fire be fueled by a production line other than that which is controlled on the platform and the $CO_2$ system is melted away, a check valve 63 can be included in line 25 which would automatically close under these conditions, locking in the pressure in the cylinder 8. The valve cannot then be opened until necessary repairs are made on the upper structure and the upper section of production pipe pressurized to equal pressure of that below the shut-in valve so that the spring 13 installed in the actuating cylinder 8 will open the valve. If a $CO_2$ system is impractical, or for one reason or another not desired, a hydraulic system can pressurize and close the valve utilizing the same sensing devices and coils or solenoid valves. The coil then would close a set of contacts, motorizing a complete hydraulic system with pump, reservoir, relief valves etc., utilizing the same inlet line and relief systems as described above. Thus the basic system is the same in either case and the system will operate on either one. The valve of the present invention is thus designed to be automatically controlled by the heat and pressure sensing circuits located at various strategic areas on a production platform and also by differential pressure of the well or wells, for that matter, as there will be as many valves installed as there are wells on any single platform. As noted, the heat sensing devices when exposed to heat in the event of a fire (e.g. 500°) closes the circuit on the electrically operated valve device which pressurizes the cylinder chamber of the shut-in valve by the use of a $CO_2$ pressurized cylinder closing it. While the differential pressure device may be installed in any convenient pressure line from the producing well by the use of a bourdon tube operated switch that will close the circuit on the same $CO_2$ system when a great change in pressure indicates a blow-out although not necessarily a fire.

The temperature sensors may be thermostatic switches made up of certain metals that expand and contact due to temperature changes, thereby closing a circuit, and can be installed at the well heads, "Christmas Trees", pump house and various other strategic areas of the production platform. So placed, the sensors will close in the well before the fire does any damage to the sensing devices, or power source for closing the valve. The pressure sensitive sensor 28 is of the bourdon tube operated switch type and may be installed in every producing well on a platform. The bourdon tube element 28' is a relatively fool-proof device and is in wide use today. It senses a differential in pressure of the well, and, through appropriate mechanical linkage to a switch 28', will complete the circuit of the $CO_2$ system closing the production valve or valves of all wells in the event of a blow-out or malfunction which lowers the pressure in that particular malfunctioning well. The threshold pressure may be set as desired.

The ball 10, its casing 1-3, and the operating mechanism are preferably made of high strength stainless steel or equivalent. The lip or edge of the ball member 10 formed by the inner hole or channel 31 and the outer spherical surface is sharp and well defined, so that it makes an effective cutting edge in case there are any wire lines or cables in the pipe string when the valve is closed.

In order to reopen the valve, once it is closed, or to unjam the mechanism should it become jammed, an auxiliary pneumatic line 60 is included in the device and has a port 61 entering into the cylinder 8 just short of its mid-way location. When the valve is closed, the port 61 will lie to the right (from the perspective of FIG. 1) of the piston bottom 14'. When a high pneumatic pressure is introduced into the auxiliary line 60 from $CO_2$ source 62 through valve 64 and through the port 61 into the bottom of the cylinder 8, the piston 14 will be forced leftward (FIG. 1) and the valve thereby opened.

The shut-off valve of the present invention can be located in the production string 20 or more feet below the "Christmas Tree" or as desired. Depending on the size of the valve as built, it may be too large to be located in the pipeline casing. However, a larger casing may be used to accommodate it or a bulge can be installed at the valve area of the casing with the installation of plugs in the casing and conduit if so required to make up assembly. The valve is of such design to assure complete closure of the well without the interference of contaminants on the valve seat that other valves, such as sliding gate types, are subject to, because of the smooth bore configuration. Moreover, because the channel 31 has the same inner diameter (I.D.) as that of the production pipe, there will be less erosion of the ball and socket, both when open and when in the process of closing due to the short time element involved in the complete shut-in process. Unlike sliding gate types, the valve of the present invention gives bubble-tight closure with a simple rotation of the inner ball 10, and the sealing is unimpaired by semi-solids and sands in suspension.

What is claimed as invention is:

1. An automatic shut-off valve system for a pipeline having high pressure fluids flowing therein comprising:
   a. an in-line ball valve having a rotatable circular-shaped inner member having a curved-outer surface and having a channel therethrough directly and fully communicating with the pipeline when said inner member is in a first position and having no direct communication with the pipeline when the inner member is rotated, the axis of said channel being perpendicular to the axis about which said inner member can rotate, said channel forming a sharp, well-defined lip at its intersection with the outer surface of said inner member, whereby when the inner member is rotated closed, the lip can serve as an effective cutting edge for cutting any wires or cables that may be in the pipeline when the valve is closed;
   b. outer casing means for enclosing and mating with said inner member, said casing comprising two end members connected together with the inner member therebetween, each forming an inward, curved surface mating with the outer curved surface of said inner member, one end member serving as the inlet means for the pipeline to the valve and the other serving as the outlet means for the valve back to the pipeline, the two end members being locked together but easily detachable, thereby allowing for easy access to the inner, working mechanisms of the valve;
   c. a primary pneumatic system for causing said inner member to rotate including a linear cylinder, piston and piston rod assembly located and enclosed within one of said end members and disposed at a right angle to and off-set from said axis of rotation;
   d. mechanical linkage means located and enclosed within the same one of said end members as said assembly and connected from said cylinder, piston and piston rod assembly to said inner member for translating the linear movement of said assembly to rotary movement of said inner member, said mechanical linkage means comprising a drive rod and bellcrank assembly with said drive rod being coterminus with said piston rod and being connected to one end of the bellcrank, the other end of the bellcrank being attached to said inner member at its axis of rotation, whereby, when said piston rod moves, it linearly moves said drive rod which through said bellcrank rotates said inner member;
   e. temperature and/or pressure sensing and actuating means connected to said assembly for sensing emergency conditions such as fires, explosions and/or high pressure conditions and actuating said assembly by introducing a pneumatic pressure into said cylinder against said piston to cause it to move in a linear direction when those certain conditions exist, whereby, when those certain conditions are sensed, the said assembly rotates the inner member to its closed position; and
   f. an auxiliary pneumatic system means for opening and unjamming the valve system, said auxiliary pneumatic system means having an outlet port in said cylinder wall on the opposite side of said piston from the primary pneumatic system and removed from the further point of travel of said piston when the inner member is rotated closed, whereby, by introducing a pneumatic pressure at said outlet port, the piston is driven back rotating said inner member open.

2. The valve system of claim 1 wherein said circular-shaped inner member is generally spherical in shape but has a flat plateau section at its outer surface, said bellcrank being attached to said inner member at said flat plateau section, whereby the outer dimensions of said outer casing means can be made more compact.

3. The valve system of claim 1 wherein said end member which encloses said assembly and said mechanical linkage system also integrally includes within the structure of its body pneumatic fluid lines feeding into said linear cylinder and leading from said end member's connection to the pipeline for said primary and said auxiliary pneumatic systems, whereby no separate lines which can be relatively easily severed are needed.

4. The valve system of claim 1 wherein said pipeline is a production line in an oil field, said in-line ball valve and the pipeline members being located within the well casing.

5. The valve system of claim 1 wherein said assembly includes a spring within the cylinder bearing against said piston to bias the valve in its open position.

6. The valve system of claim 5 wherein a set screw is positioned at the end of the cylinder toward which the piston is biased in the valve open position to easily adjust and set the open position and relative location of said mechanical linkage means.

* * * * *